United States Patent [19]
Walter

[11] Patent Number: 5,508,975
[45] Date of Patent: Apr. 16, 1996

[54] APPARATUS FOR DEGASSING LIQUIDS

[75] Inventor: Bruno H. Walter, North Vancouver, Canada

[73] Assignee: Industrial Sound Technologies, Inc., North Vancouver, Canada

[21] Appl. No.: 362,811

[22] Filed: Dec. 22, 1994

Related U.S. Application Data

[63] Continuation-in-part of Ser. No. 316,915, Oct. 3, 1994, which is a continuation-in-part of Ser. No. 936,032, Aug. 25, 1992, Pat. No. 5,459,699.

[51] Int. Cl.$^6$ ............................................. H04R 23/00
[52] U.S. Cl. ..................... 367/142; 210/188; 95/260; 96/175; 55/277
[58] Field of Search ..................... 210/188; 95/260; 96/175; 55/277; 422/20, 128; 367/140, 142; 588/227

[56] References Cited

U.S. PATENT DOCUMENTS

| | | | |
|---|---|---|---|
| 2,647,846 | 8/1953 | Bagno | 367/142 |
| 3,369,519 | 2/1968 | Bricout | 116/27 |
| 3,376,949 | 4/1968 | Baker et al. | 181/120 |
| 3,409,470 | 11/1968 | Karpovich | 134/1 |
| 3,536,157 | 10/1970 | Anstey | 181/120 |
| 3,690,403 | 9/1972 | Davis | 181/120 |
| 3,764,965 | 10/1973 | McLean et al. | 181/120 |
| 4,131,178 | 12/1978 | Bouyoucos | 181/120 |
| 4,252,210 | 2/1981 | Sodich | 181/119 |
| 4,271,925 | 6/1981 | Burg | 181/120 |
| 4,396,088 | 8/1983 | Bayhi | 181/120 |
| 4,713,277 | 12/1987 | Akiyama et al. | 428/131 |
| 4,830,122 | 5/1989 | Walter | 175/106 |
| 5,009,272 | 4/1991 | Walter | 175/56 |
| 5,085,783 | 2/1992 | Feke et al. | 210/748 |
| 5,129,320 | 7/1992 | Fadner | 101/365 |
| 5,372,634 | 12/1994 | Monahan | 96/175 |

FOREIGN PATENT DOCUMENTS

| | | |
|---|---|---|
| 1359616 | 3/1964 | France . |
| 620483 | 10/1935 | Germany . |
| 510300 | 4/1976 | U.S.S.R. . |

*Primary Examiner*—J. Woodrow Eldred
*Attorney, Agent, or Firm*—Oyen, Wiggs, Green & Mutala

[57] ABSTRACT

Rarefaction pulses are generated in a chamber containing a liquid to be degassed. The rarefaction pulses are generated by creating repeated water hammers in a conduit. The water hammers result in sudden high pressure pulses which deform a stiff springy, impermeable deflection cap. After the water hammer pulses pass, the deflection cap snaps back toward its equilibrium position. The snapping action of the deflection cap causes a rarefaction pressure pulse which enhances bubble formation in the chamber. The deflection cap may resonate for some time after each water hammer pulse passes. During the interval when the deflection cap resonates the deflection cap generates an attenuated acoustic wave which is transmitted into the liquid being degassed. The deflection cap may also be driven by a system in which a high pressure fluid, such as steam, is introduced into a sealed chamber behind the deflection cap and then suddenly vented.

20 Claims, 7 Drawing Sheets

APPARATUS FOR DEGASSING LIQUIDS

RELATED APPLICATIONS

This application is a continuation-in-part of my pending U.S. patent application Ser. No. 08/316,915 filed Oct. 3, 1994 entitled Water Hammer Driven Cavitation Chamber, which is a continuation-in-part of U.S patent application Ser. No. 07/936,032 filed Aug. 25, 1992 entitled Method and Apparatus for Generating High Energy Acoustic Pulses, now U.S. Pat. No. 5,459,699.

FIELD OF THE INVENTION

This invention relates to apparatus for generating intense rarefaction pressure waves in a liquid. Apparatus according to the invention may be used, for example, for degassing liquids, removing particles from liquids by flotation or treating fluids or slurties.

BACKGROUND OF THE INVENTION

Intense ultrasonic fields are used for treating materials in various ways including cleaning surfaces, promoting certain types of chemical reactions, and degassing liquids. Such fields are generally generated by electrically driven piezo-electric or magnetostrictive transducers. In general, these transducers produce acoustic waves which include intense compression pulses. For example, U.S. Pat. No. 5,164,094 Stuckart; U.S. Pat. No. 4,673,512 Schram; U.S. Pat. No. 4,983,189 Peterson et al.; and U.S. Pat. No. 5,192,450 Heyman disclose prior art acoustic liquid processing devices. Other prior art acoustic liquid processing devices include U.S. Pat. No. 2,578,505 Carlin; U.S. Pat. No. 3,056,589 Daniel; U.S. Pat. No. 3,021,120 Van der Burgt; U.S. Pat. No. 3,464,672 Massa; U.S. Pat. No. 4,369,100 Sawyer; U.S. Pat. No. 4,433,916 Hall; U.S. Pat. No. 4,352,570 Firth; U.S. Pat. No. 3,946,829 Mori et al.; European Patent specification 0 449 008 Desborough; and Japanese patent 3-151084 Murata.

McCord, U.S. Pat. No. 4,618,263 discloses an acoustic cleaner which incorporates a cavitation generator for agitating liquid in an enclosure. The enclosure is provided with a wave reflecting surface for reflecting acoustic waves from the margin of the liquid back into the body of the liquid to reinforce cavitation in the chamber.

Kanazawa, U.S. Pat. No. 4,727,734 discloses an ultrasonic clothes washer. The washer has a metal tub for receiving clothes. Bubbles are introduced into the tub to promote cavitation and to reflect the ultrasound so that all articles in the tub are irradiated with ultrasound.

A disadvantage of prior art cavitation chambers is that the electromechanical equipment for generating high powered acoustic signals with a piezoelectric or magnetostrictive transducer is inherently expensive and inefficient. Another disadvantage of such apparatus for liquid degassing purposes is that the intense high pressure pulses can interfere with the degassing process.

SUMMARY OF THE INVENTION

An object of this invention is to provide a robust inexpensive apparatus for degassing liquids.

The invention provides a diquid degassing apparatus comprising: a driving system and a chamber coupled to the driving system by a coupler. The driving system comprises: means for causing a first liquid to flow through a first conduit from an upstream end to a downstream end; a valve in the first conduit for selectively substantially blocking the flow of the first liquid, the valve having an open position wherein the flow is substantially unimpeded and a closed position wherein the flow is at least substantially blocked; an actuator for repeatedly: opening the valve; keeping the valve open for a period sufficient to allow the first liquid to commence flowing through the first conduit and the valve with sufficient velocity to produce a water hammer within the first conduit when the valve closes; and closing the valve —to produce a continuous series of water hammer acoustic pulses within the first conduit. The container holds a second liquid to be degassed . . . the coupler comprises a fluid-filled passage having a first end connected to the first conduit upstream from the valve and a second end connected to an interior region of the chamber and a stiff, resiliently deformable, impermeable, deflection cap blocking said fluid-filled passage.

A second aspect of the invention provides a method for treating a material. The method comprises the steps of: providing a liquid-filled conduit coupled to a chamber by a coupler comprising a stiff springy deflection cap; placing a material to be treated in the chamber; causing a liquid to flow through the conduit; suddenly blocking the conduit a distance D downstream from the coupler to cause a high pressure water hammer pulse in the liquid within the conduit; allowing the high pressure water hammer pulse to deform the deflection cap; allowing the deflection cap to snap back to an equilibrium position to transmit a rarefaction pressure pulse into the chamber; and repeating these steps until the material has been sufficiently treated by the rarefaction pulses.

A third aspect of the invention provides liquid degassing apparatus comprising: a vessel to contain a liquid to be degassed; a stiff, resiliently deformable, fluid impermeable, deflection cap having a first side in contact with the liquid to be degassed the deflection cap having a second side closing a sealed chamber; a source of high pressure fluid coupled to a volume inside the sealed chamber through an inlet valve; an exhaust valve in fluid communication with the volume inside the sealed chamber; and control means for repeatedly opening the inlet valve, retaining the inlet valve open until the deflection cap is deformed by pressure of the high pressure fluid in the volume, dosing the inlet valve and suddenly opening the exhaust valve to allow the deflection cap to suddenly snap back toward an equilibrium position.

A fourth aspect of the invention comprises a method for creating a series of rarefaction pulses in a liquid. The method comprises the steps of: providing a chamber having one side closed by a stiff, elastically deformable deflection cap, the deflection cap having an outer side in contact with a liquid; deforming the deflection cap by introducing a fluid into the chamber under high pressure and allowing the high pressure fluid to deform the deflection cap; allowing the deflection cap to snap back to an equilibrium position to transmit a rarefaction pressure pulse into the liquid; and repeating the last two steps.

BRIEF DESCRIPTION OF THE DRAWINGS

In drawings which illustrate specific embodiments of the invention, but which should not be construed as restricting the spirit or scope of the invention in any way.

DETAILED DESCRIPTION OF PREFERRED EMBODIMENTS OF THE INVENTION

Figure 1:
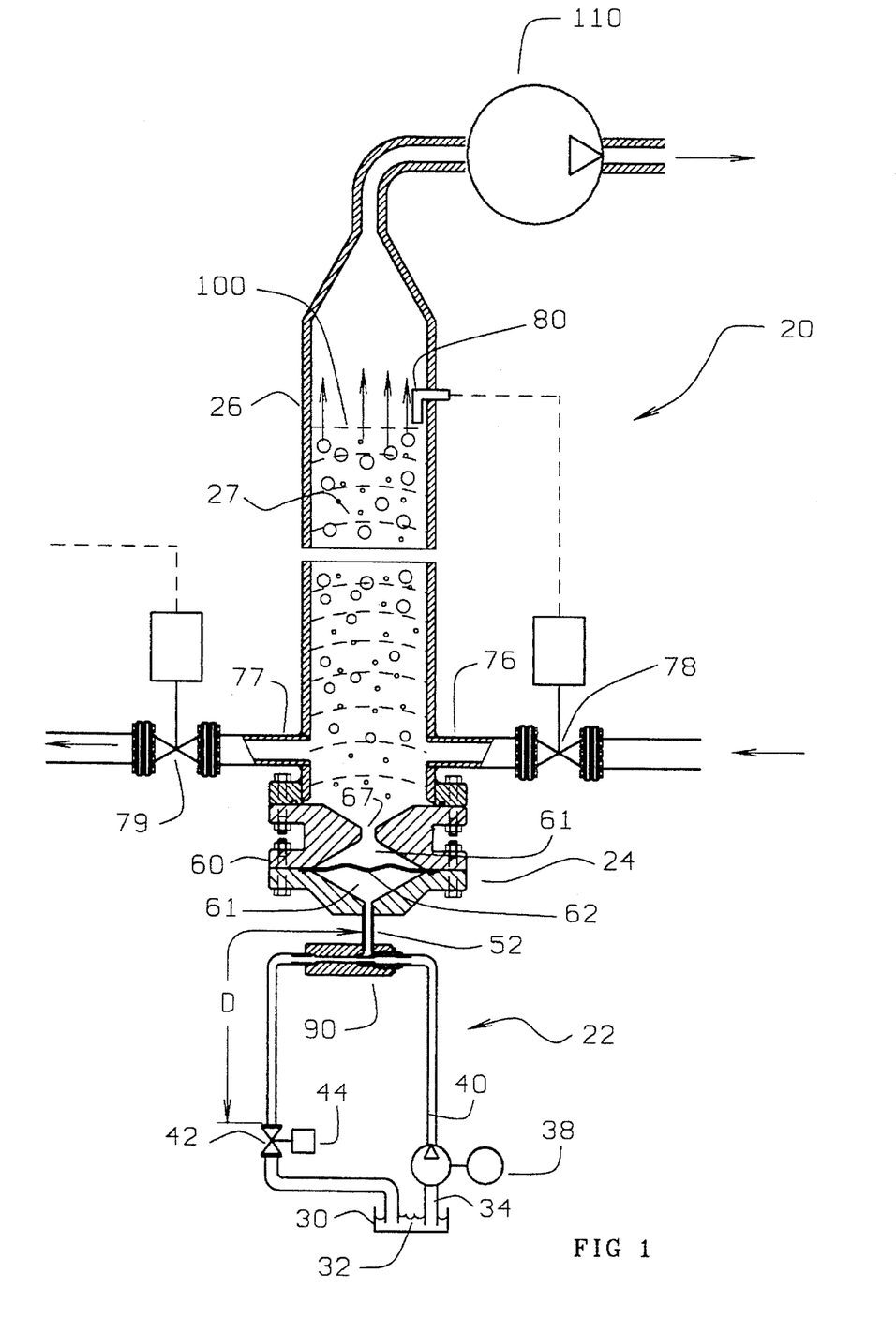
FIG. 1 is a section through a water-hammer driven liquid degassing apparatus according to the invention.

As shown in FIG. 1, liquid processing system 20 comprises a hydraulic driving system 22, a coupling 24, and a chamber 26. Hydraulic driving system 22 generates high intensity acoustic pulses. Coupling 24 conveys those acoustic pulses to chamber 26, alters the characteristics of the pulses, as described below, and prevents fluid 27 in chamber 26 from commingling with working fluid 32 in driving system 22.

Hydraulic driving system 22 comprises a reservoir 30 containing a working fluid 32. Working fluid 32 may be any suitably inert and non-compressible fluid, such as water, hydraulic fluid, or the like. Working fluid 32 is preferably characterized by a high cavitation threshold. The creation of acoustic pulses for doing work by the generation of water hammer in a conduit is discussed in some detail in co-pending U.S. patent application Ser. Nos. 07/936,032 and 08/316,915 which are incorporated herein by reference.

Working fluid 32 is drawn into a conduit 34 by a pump 36 which is driven by a motor 38. Pump 36 may be, for example, a centrifugal pump. The outlet of pump 36 is connected to a conduit 40 which carries working fluid 32 back to reservoir 30. A valve 42 is located in conduit 40. A valve actuator 44 is provided to open and shut valve 42. Coupler 24 is connected to conduit 40 by a venturi unit 90 or a T-junction at a point a distance D upstream from valve 42 and a conduit 52. Conduits 34, 40 and 52 are preferably thick-wall pipe.

Driving system 22 operates as follows. Pump 36 pumps working fluid 32 continuously through conduit 40. With valve 42 open, working fluid 32 flows with a velocity V through conduit 40. Valve actuator 44 periodically suddenly closes valve 42 to substantially or completely block the flow of working fluid 32 through conduit 40. The sudden blockage of working fluid 32 in conduit 40 creates a water hammer pressure pulse which propagates upstream in conduit 40 from valve 42. The generation of water hammer pulses is discussed in many texts on fluid mechanics including, for example, R. L. Daugherty and J. B. Franzini, *Fluid Mechanics With Engineering Applications*, pages 425–431 McGraw Hill Book Company, 1977.

The magnitude of the water hammer pressure pulse is determined by the velocity V, the compressibility of the working fluid 32, the speed at which valve 42 is closed, the degree of closure of valve 42 and the speed of sound in working fluid 32, among other factors. Under ideal circumstances, when valve 42 closes fully, the magnitude of the water hammer pressure pulse is given by:

$$p_h = \varrho c_p V \quad (1)$$

where $P_h$ is the pressure of the water hammer pulse, $\rho$ is the density of working fluid 32, and $c_p$ is the velocity at which the water hammer pulse travels in conduit 40. By increasing the velocity V of working fluid 32 in conduit 40, making conduit 40 rigid, selecting a working fluid 32 which is highly incompressible, and closing valve 42 completely and very quickly the intensity of high pressure acoustic pulses generated by driving system 22 may be maximized.

The high pressure pulse created by the water hammer propagates upstream from valve 42 until it reaches venturi unit 90. The high pressure pulse propagates into coupler 24 through conduit 52. To generate pressure pulses which carry the same amount energy with an electromechanical transducer, such as a magnetostrictive transducer, would require an impractically large transducer having an impractically long travel.

Venturi unit 90 comprises a nozzle 92 which is connected to conduit 40 at the upstream end of venturi unit 90. Nozzle 92 is directed into a narrow portion 94 of conduit 40 which acts as a mixing area within venturi unit 90. Conduit 52 is connected to an annular chamber 96 surrounding nozzle 92. Chamber 96 is in fluid communication with conduit 40 through an annular orifice 97 around the tip of nozzle 92.

Venturi unit 90 functions as an aspirator or "jet pump" to reduce the pressure inside conduit 52 while working fluid 32 is flowing with a significant velocity through venturi unit 90. The flow of working fluid 32 reduces the pressure in annular chamber 96. This, in turn, reduces the pressure in conduit 52. When valve 42 is suddenly closed, a pressure pulse propagates upstream into chamber 96 and along conduit 52, through coupler 24 and into chamber 26 as described above. Venturi unit 90 is not necessary to the practice of the invention and may be replaced with a simple T-junction. However, venturi unit 90 can increase the range of variation of pressure inside conduit 52.

The average pressure within conduit 52 may be reduced by adjusting valve actuator 44 to leave valve 42 open for longer periods so that venturi unit 90 spends a higher proportion of each cycle operating as an aspirator.

Hydraulic driving system 22 has been described so far as a closed circuit. Hydraulic system 22 could equally well comprise an open circuit wherein working fluid 32 is simply discharged, or diverted to some other use, after exiting valve 42. A closed circuit is generally preferable because it avoids wasting working fluid 32. The purpose of pump 36 and motor 38 is to feed fluid 32 into conduit 40 under pressure. Pump 36 and motor 38 may be replaced with any means for driving working fluid 32 into conduit 40 with sufficient velocity to create water hammer pulses as described above.

The purpose of coupler 24 is to change the characteristics of the pressure pulses which are transmitted into chamber 26, as described below, and to prevent working fluid 32 from commingling with fluid 27 inside chamber 26.

Coupler 24 comprises a body 60 within which is a channel 61 which extends from an end of conduit 52 into chamber 26. Conduit 52 and channel 61 together form a fluid-filled passage extending between conduit 40 and chamber 26. A stiff, springy, fluid impervious deflection cap 62 blocks channel 61. Deflection cap 62 and channel 61 form a sealed chamber 161 which is connected to conduit 40 through conduit 52. Water hammer pressure pulses generated in driving system 22 propagate into coupler 24 along conduit 52. The water hammer pressure pulses are intense enough to deform deflection cap 62, as indicated in dashed outline in FIG. 2. The inventor considers that the deformation of deflection cap 62 happens relatively slowly, in acoustic terms, because working fluid 32 must flow through conduit 52 into chamber 161 and do work to deflect deflection cap 62. During the deflection of deflection cap 62 energy is stored in deflection cap 62. The relatively slow deflection of deflection cap 62 toward chamber 26 causes a relatively low intensity pressure pulse to propagate into fluid 27, this pressure pulse travels through channel 61 into chamber 26. Therefore, the inventor considers that deflection cap 62 initially attenuates somewhat the water hammer pulses as they propagate through coupler 24.

Figure 2:
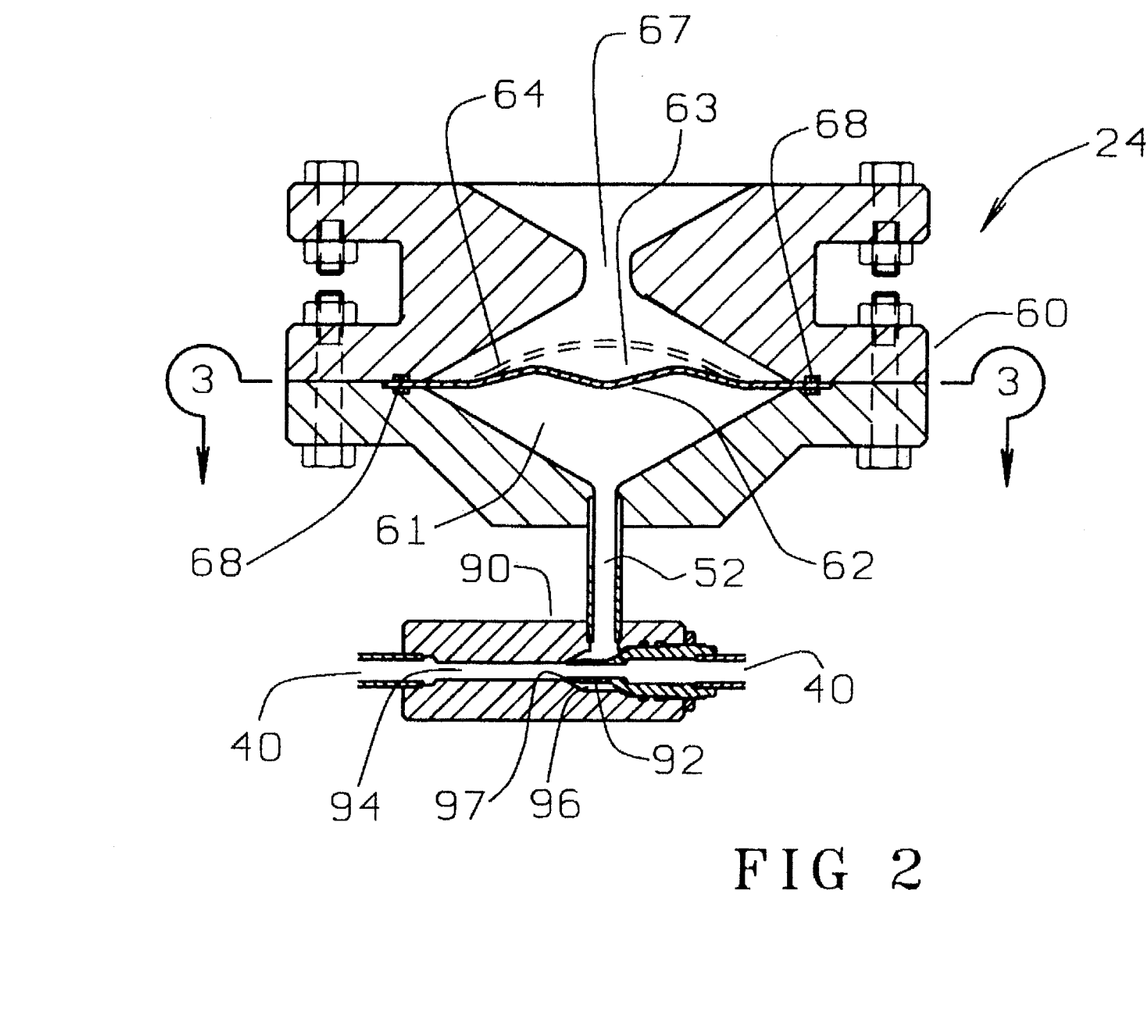
FIG. 2 is a detailed section through the connection between a hydraulic driving system and a chamber in the apparatus of FIG. 1.

After a water hammer pulse passes then the pressure within conduit 52 and chamber 161 decreases. When this happens the pressure of working fluid 32 is no longer sufficient to hold deflection cap 62 in its deformed position and deflection cap 62 begins to snap back toward its equilibrium position. This snapping action is very sudden because deflection cap 62 is stiff. The snapping of deflection cap 62 forces excess working fluid 32 out of chamber 161. The sudden snapping of deflection cap 62 away from chamber 26 causes an intense rarefaction pulse to propagate into chamber 26 from deflection cap 62 each time the pressure pulse generated by driving system 22 passes. Such rarefaction pulses are useful in promoting the onset of cavitation and in creating bubbles in chamber 26. If a venturi unit 90 is used, the low pressures which result when venturi unit 90 is functioning as an aspirator help to draw deflection cap 62 more rapidly toward its equilibrium position.

After each pulse from hydraulic driving system 22 deflection cap 62 will continue to oscillate back and forth for some time. This high frequency "ringing" is attenuated as energy, in the form of acoustic waves, is broadcast into fluid 27 and working fluid 32 by the vibrating deflection cap 62. Deflection cap 62 is preferably mounted so that it has a resonant mode of oscillation that is excited when a pressure pulse from hydraulic driving system 22 is applied to it.

The inventor considers that the "ringing" of deflection cap 62 is advantageous for two reasons. Firstly, it provides acoustic pressure pulses to treat fluid 27 in chamber 26 during the intervals between pulses generated by hydraulic driving system 22. Secondly, the acoustic signal produced by the ringing deflection cap 62 comprises a series of rarefaction pulses alternating with compression pulses which steadily decreases in amplitude. Thus, each rarefaction pulse is followed by a compression pulse of lower amplitude. It is considered that this waveform promotes the formation of bubbles in fluid 27 because the rarefaction pulses tend to cause bubbles to grow and the compression pulses, because they are reduced in amplitude, are not sufficient to cause the bubbles to collapse.

Figure 3:
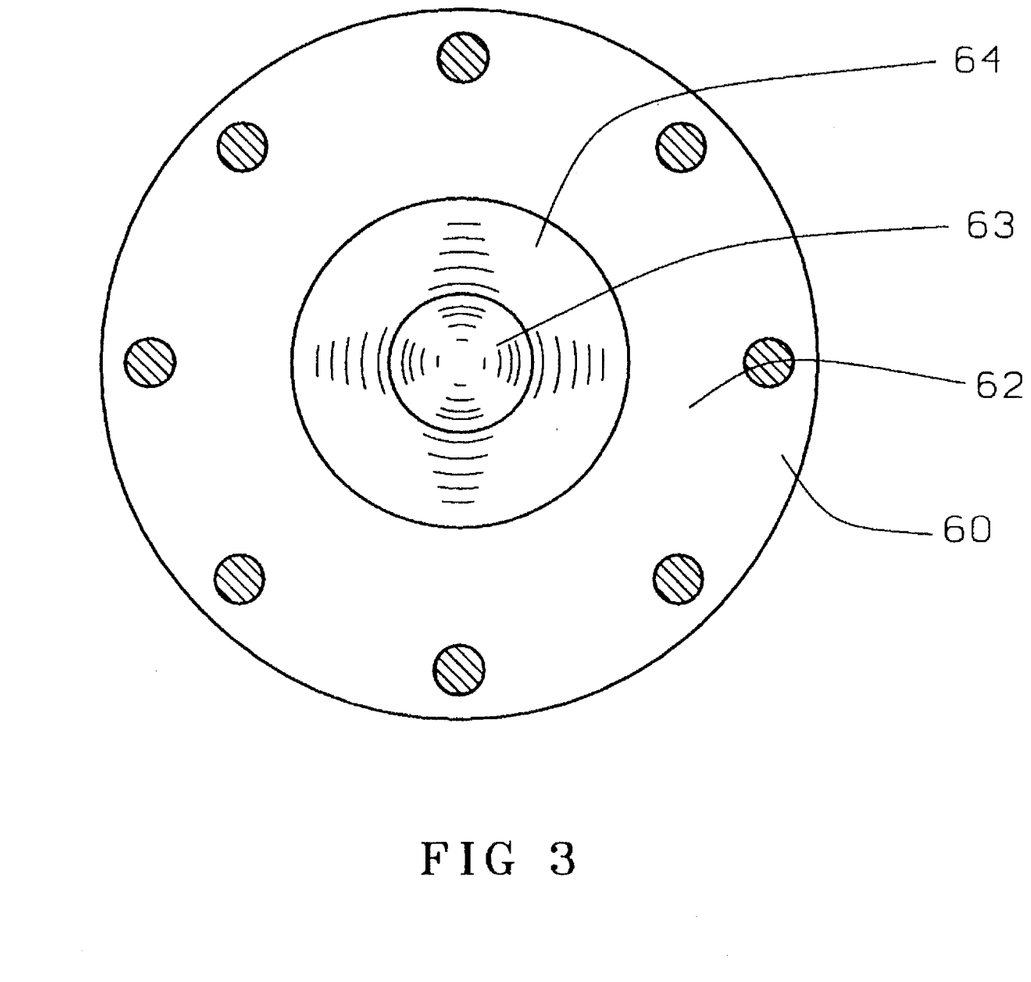
FIG. 3 is a section in the plane 3—3 of the apparatus of FIGS. 1 and 2.
Figure 4:
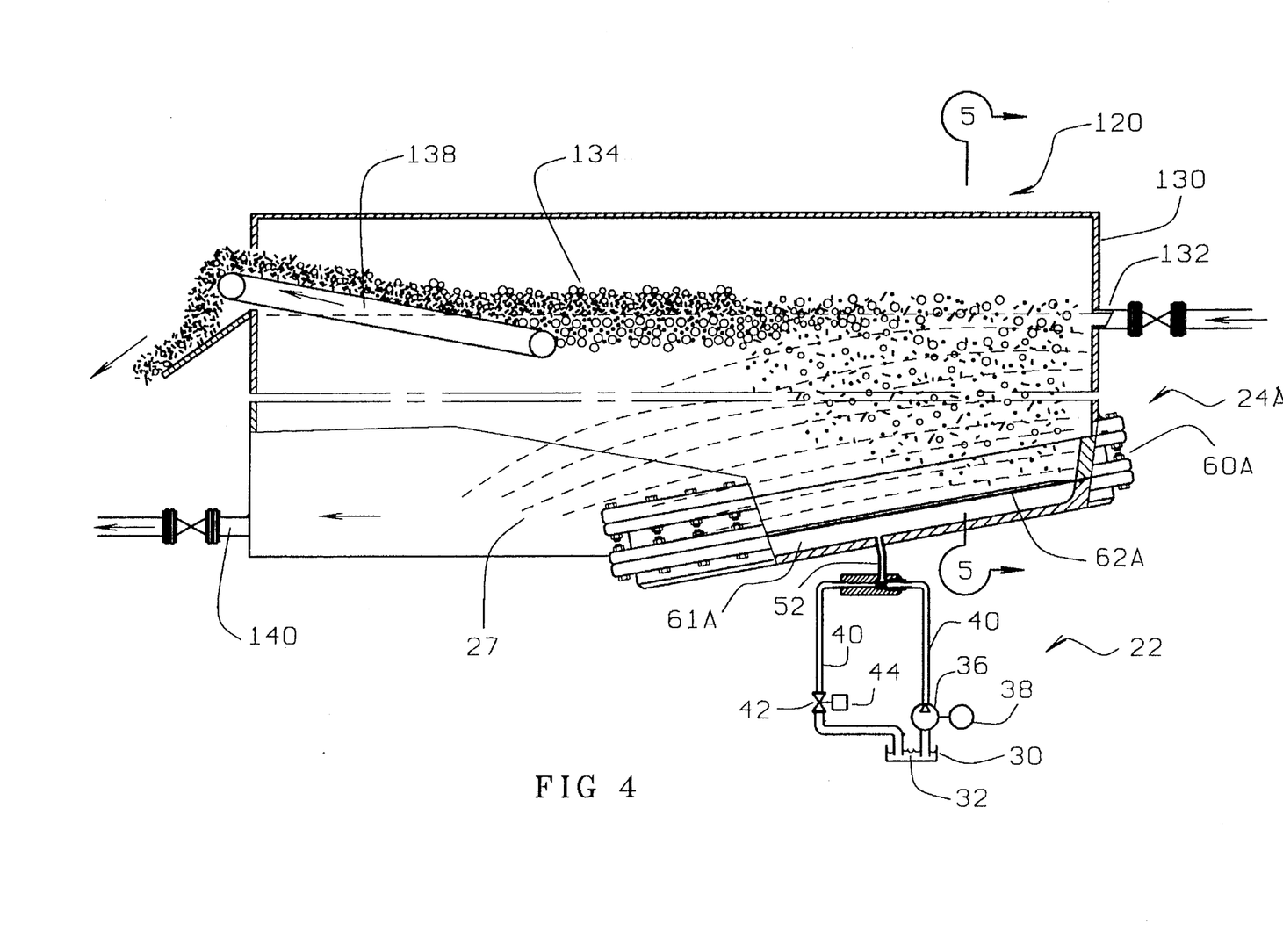
FIG. 4 is a section through an alternative embodiment of the invention adapted for removal of particles by froth flotation.

Deflection cap 62 is preferably formed from a stiff springy metal such as hardened steel. Deflection cap 62 is preferably round, as shown in FIG. 3, or an elongated oval, as shown in FIG. 4, but may have various shapes. Deflection cap 62 may be flat, but for more efficiency deflection cap 62 should be contoured. There are many possible shapes for the contours of deflection cap 62. For example, deflection cap 62 may have a central area 63 which is indented toward chamber 161. Deflection cap 62 may also have a region 64 which is indented away from chamber 161 surrounding central area 63. Preferably the radius of central area 63 is approximately the same as the width of region 64. Most preferably the shape of deflection cap 62 is such that it can be held in a deformed position by a fluid pressure which is lower than the fluid pressure required to initially deform deflection cap 62 from its equilibrium position. This provides an enhanced "snap" action.

Deflection cap 62 may be, for example, made from 4340 steel hardened to a Rockwell hardness (HRc) of 43–45. Deflection cap 62 may also be made of a suitable composite material, such as a fibre reinforced plastic (FRP) material having the required mechanical properties. Deflection cap 62 may also be coated with a thin layer of rubber to prevent cavitation damage to deflection cap 62.

Channel 61 preferably gently tapers from the end of conduit 52 to a larger diameter area where deflection cap 62 is mounted. The total volume of conduit 52 and the portion of channel 61 in fluid communication with conduit 52 is preferably significantly less than the volume of fluid in conduit 40 which is arrested by the closure of valve 42. The end of channel 61 in fluid communication with chamber 26 may taper gradually to an aperture 67.

Aperture 67 tends to prolong the most intense rarefaction pulses produced by the motion of deflection cap 62 by limiting the rate at which fluid 27 can flow into the portion of channel 61 adjacent pressure cap 62. The inventor considers that prolonging such rarefaction pulses tends to increase the rate of bubble formation in liquid 27. Aperture 67 does not substantially effect the amplitude of acoustic pulses produced by smaller motions of deflection cap 62 because small amplitude motions of deflection cap 62 are accompanied by very little flow in fluid 27.

Deflection cap 62 is sealingly mounted in channel 61. For example, deflection cap 62 may be clamped between two parts of body 60, and sealed with O-rings 68, as shown in FIG. 2.

Chamber 26 may be formed from a segment of pipe 70. Fluids to be treated may be introduced into chamber 26. The embodiment shown in FIGS. 1 and 2 is adapted for degassing fluid 27. Chamber 26 is a tall vertical tube with an inlet 76 equipped with a valve 78 and an outlet 77 equipped with a valve 79. With valve 79 closed a batch of liquid 27 is introduced into chamber 26 by opening valve 78. A sensor 80 detects when liquid 27 reaches a level 100 and automatically closes valve 78. Hydraulic driving system 22 can then be actuated to treat fluid 27 for a time sufficient to achieve the desired results. A vacuum pump 110 is provided to draw off gases released from fluid 27. Outlet valve 79 is then opened to alow the degassed fluid to be drawn off through outlet 77.

In operation, water hammer pulses are developed in hydraulic driving system 22, as described above. The high pressure water hammer pulses are generated periodically at first frequency $f_1$ by valve actuator 44. The high pressure pulses pass into coupler 24, and deflect deflection cap 62. Motion of deflection cap 62 causes some spherical acoustic wave fronts, which are indicated schematically in FIG. 1, to propagate into chamber 26 from aperture 67.

Valve actuator 44 may be an electronically operated solenoid or any other known mechanism for rapidly opening and closing valve 42. A preferred form of valve actuator is shown in FIGS. 3 and 4 of my co-pending application Ser. No. 08/316,915 entitled Water Hammer Driven Cavitation Chamber.

From the foregoing, it will be readily apparent to those skilled in the art that Hydraulic driving system 22 may be used together with a coupler 24 incorporating a springy deflection cap 62 in other applications than degassing fluids. For example, FIG. 4 shows apparatus 120 according to the invention for removing suspended particles from a fluid 27 by flotation.

Apparatus 120 comprises a hydraulic driving system 22 as described above. Fluid 27 is introduced into a tank 130 through an inlet 132. A coupler 24A is located in tank 130 below inlet 132. Hydraulic driving system creates pressure pulses which are delivered to coupler 24A through conduit 52 as described above. Coupler 24A is preferably elongated, as shown. An array of two or more smaller couplers may be used in place of the single coupler 24A which is illustrated.

The rarefaction pulses generated by hydraulic driving system 22 and coupler 24A cause cavitation bubbles to form in fluid 27. The bubbles float upward in fluid 27 and carry suspended particles which are entrained in fluid 27 with them. The bubbles and entrained particles form a froth 134 on the surface of fluid 27. Froth 134 may be skimmed off by any suitable means, such as a conveyor 138. Cleaned fluid 27 may be withdrawn through an outlet 140. Dissolved gases and/or frothing agents may be added to fluid 27 upstream from tank 130 to enhance bubble formation in tank 130. The method and apparatus described herein are capable of producing a great many very small bubbles.

Figure 6:
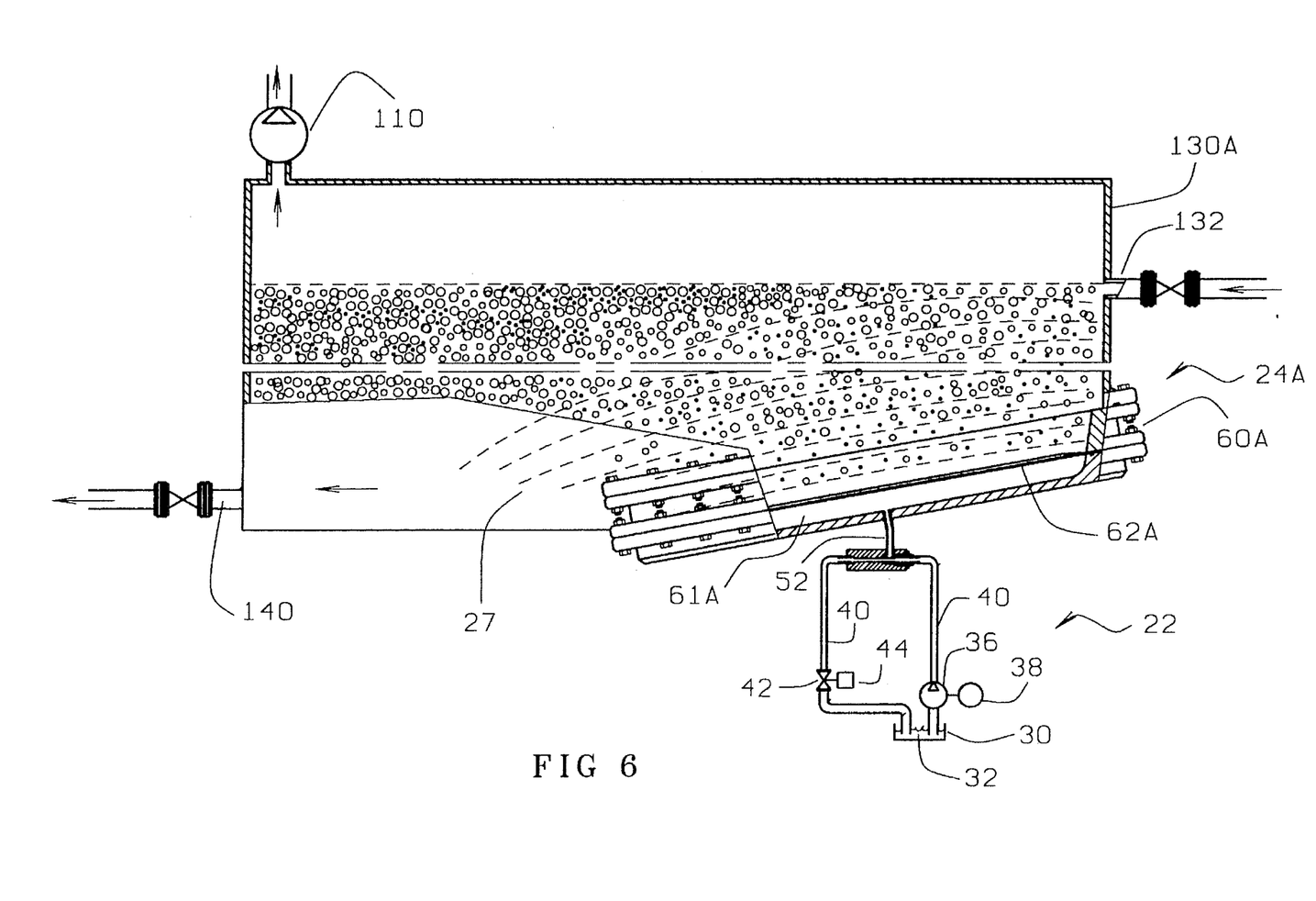
FIG. 6 is an alternative embodiment of the apparatus of FIG. 4 adapted for continuous degassing; and, FIG. 7 is an alternative embodiment of the apparatus of FIG. 1 driven by a source of high pressure fluid.

FIG. 6 shows apparatus 24A which is similar to the apparatus 24 of FIG. 4 but is adapted for continuous degassing of a liquid 27. Liquid 27 flows slowly through a tank 130A. Liquid 27 enters tank 130A through inlet 132. Degassed liquid is drawn off through outlet 140. Tank 130A is closed and equipped with a vacuum pump 110 which lowers the ambient pressure at the surface of liquid 27 inside tank 130 A and draws off gases which are released from liquid 27.

Figure 5:
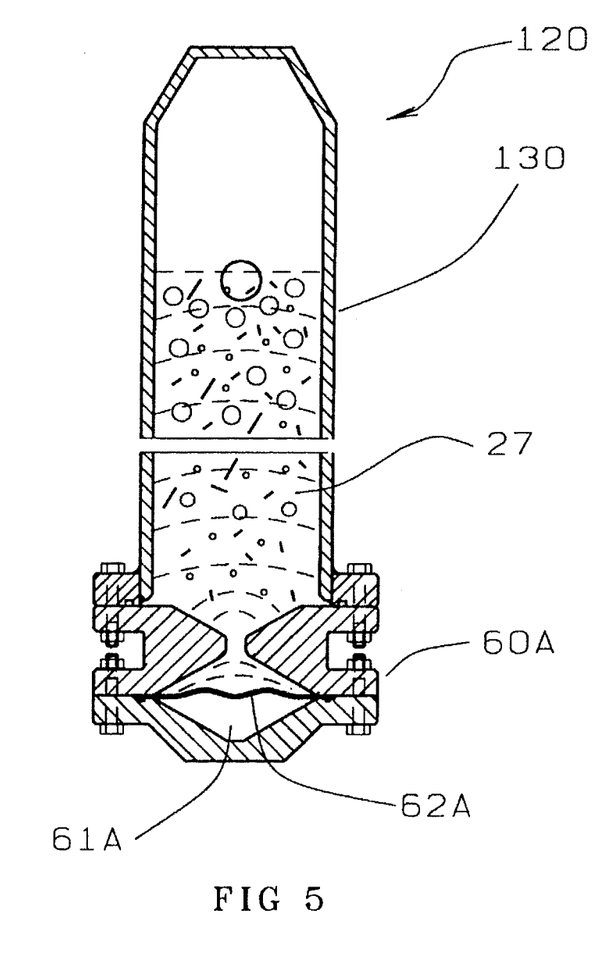
FIG. 5 is a cross section in the plane 5—5 of the apparatus of FIG. 3.

As described above, with reference to FIG. 5, rarefaction pulses generated by hydraulic driving system 22 and coupler 24A cause dissolved gases in fluid 27 to be released in the form of small bubbles. These bubbles float to the surface of liquid 27 where they ultimately break, and release their gaseous contents to be drawn off by pump 110.

Figure 7:
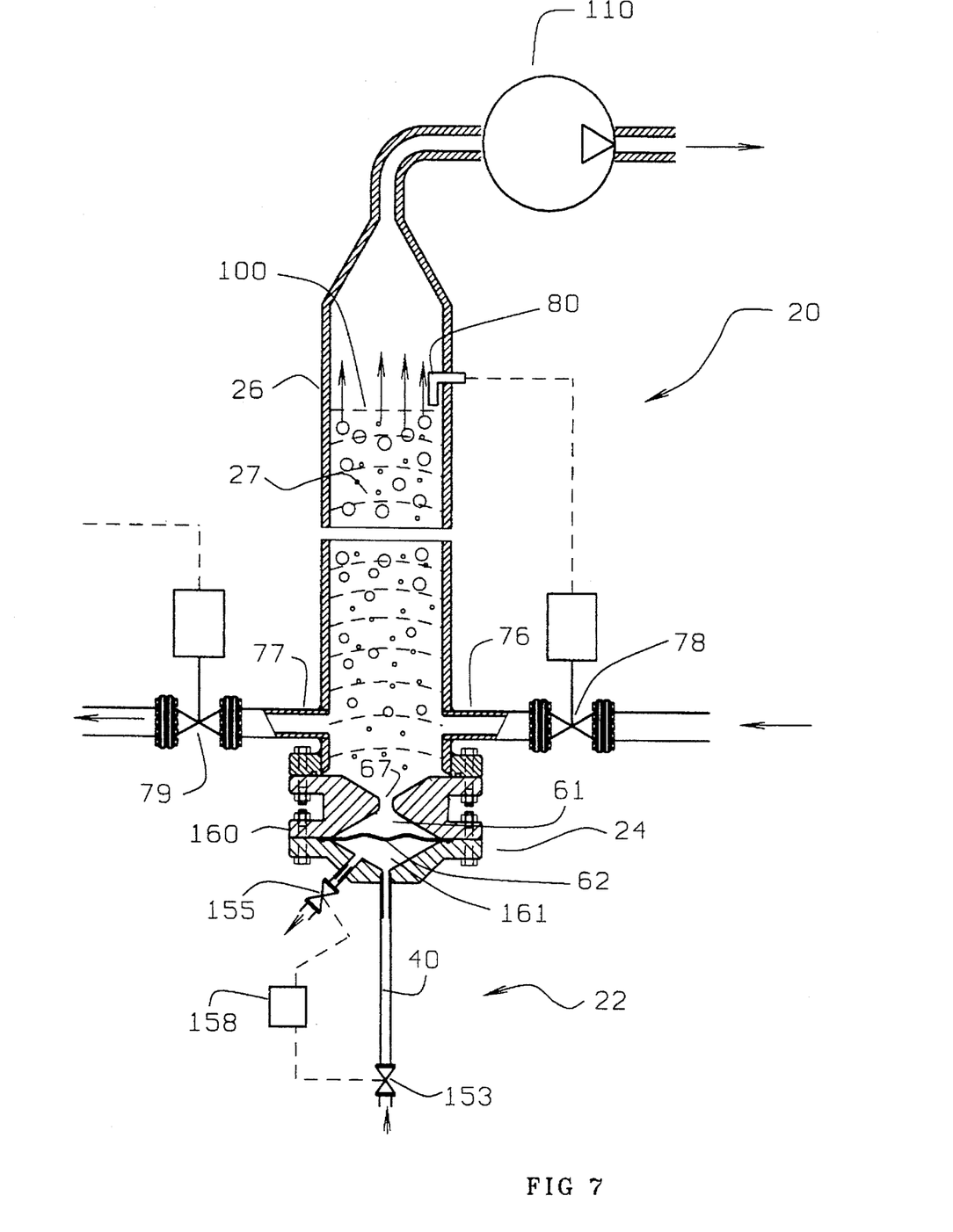

FIG. 7 shows an alternative embodiment of the invention in which the motion of deflection cap 62 is driven by a high pressure liquid or gas instead of by high pressure pulses generated by water-hammer. In the apparatus of FIG. 7, a source of a high pressure fluid, which may be a gas or a liquid, is connected through a valve 153 and a section of conduit 40 to channel 61. The high pressure fluid may be, for example, high pressure steam which is available in many industrial settings. An exhaust valve is provided to allow high pressure liquid or gas to escape from channel 61. Valves 153 and 155 may be operated by a controller 158, such as an electronic controller.

In operation, valve 153 is opened with valve 155 closed to allow high pressure liquid or gas to pass into channel 61 where it pushes on, and deforms, deflection cap 62. This deformation can be caused to occur relatively slowly by limiting the opening of valve 153. Valve 153 is then closed and valve 155 is suddenly opened. When valve 155 is opened then the pressure in channel 61 suddenly drops and deflection cap 62 begins to snap toward its equilibrium position, as described above. The cycle is completed by closing valve 155 and re-opening valve 153. Deflection cap 62 may be allowed to "ring" for an interval before closing valve 155 and/or before re-opening valve 153.

EXAMPLE

A hydraulic driving system substantially as shown in FIG. 1 was used in which a 2 horsepower motor operating at approximately one eighth load drove a centrifugal pump, the centrifugal pump pumped hydraulic fluid through a loop of 3 meters of ½ inch internal diameter reinforced hydraulic hose. The flow of hydraulic fluid in the hydraulic hose was interrupted at a frequency of approximately 35 Hz. by a cam operated valve. A section of ½ inch internal diameter reinforced hydraulic hose was connected between a tee in the first hydraulic hose and a coupler, as described below. The tee was located 1 meter upstream from the valve. The coupler comprised a metal body having a 3 inch diameter deflection cap made of 1/32 inch thick 4340 steel hardened to 45 HRc mounted in it with O-rings substantially as shown in FIG. 1. The deflection cap had a profile substantially as shown in FIG. 1. The depth of indentation 63 was approximately ¼ inch. The diameter of aperture 67 was approximately ¼ inch. A 2 inch diameter vertical plexiglass tube filled with water to a height of approximately 2 meters was attached to the coupler. Each time the hydraulic driving system created a pressure pulse, the interior of the plexiglass tube became filled with small bubbles.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Liquid degassing apparatus comprising:
   (a) a driving system comprising:
      (i) means for causing a first liquid to flow through a first conduit from an upstream end to a downstream end;
      (ii) a valve in said first conduit for selectively substantially blocking said flow of said first liquid, said valve having an open position wherein said flow is substantially unimpeded and a closed position wherein said flow is at least substantially blocked;
      (iii) an actuator for repeatedly: opening said valve; keeping said valve open for a period sufficient to allow said first liquid to commence flowing through said first conduit and said valve with sufficient velocity to produce a water hammer within said first conduit when said valve closes; and closing said valve; to produce a continuous series of water hammer acoustic pulses within said first conduit;
   (b) a chamber containing a second liquid coupled to said hydraulic driving system; and
   (c) a coupler in fluid communication with said driving system and said chamber, said coupler comprising a fluid-filled passage having a first end connected to said first conduit upstream from said valve and a second end connected to an interior region of said chamber and a stiff, resiliently deformable, impermeable, deflection cap blocking said fluid-filled passage.

2. The apparatus of claim 1 wherein said hydraulic driving system further comprises an aspirator in said first conduit wherein said second conduit is connected to a suction port of said aspirator.

3. The apparatus of claim 2, wherein said aspirator comprises an inlet upstream from an outlet, a nozzle coupled to said inlet and directed into said outlet, and an annular space around an end of said nozzle wherein said second conduit is in fluid communication with said annular space.

4. The apparatus of claim 1 wherein said deflection cap comprises a metal sheet.

5. The apparatus of claim 4 wherein said sheet comprises a central indented area.

6. The apparatus of claim 5 wherein said sheet further comprises a second indented area, surrounding said central indented area, said second indented area indented in a direction opposite to said indented area.

7. The apparatus of claim 6 wherein said sheet comprises hardened steel.

8. The apparatus of claim 1 wherein said passage has a first portion having a smaller cross sectional area, and a second portion adjacent said deflection cap having a larger cross sectional area 9. The apparatus of claim 8 wherein said passage further comprises a constriction between said deflection cap and said chamber.

10. The apparatus of claim 1 wherein said chamber comprises a suction port above an upper surface of said second liquid.

11. The apparatus of claim 10 wherein said chamber comprises a vertical column.

12. The apparatus of claim 1 wherein said second liquid has a free surface in said chamber and said coupler is below said free surface.

13. The apparatus of claim 12 wherein said second liquid is contaminated by suspended particles.

14. The apparatus of claim 13 further comprising a skimmer for removing froth from said free surface of said second liquid.

15. The apparatus of claim 1 wherein said first liquid has a higher cavitation threshold than said second liquid.

16. Liquid degassing apparatus comprising:
   (a) a vessel to contain a liquid to be degassed;
   (b) a stiff, resiliently deformable, fluid impermeable, deflection cap having a first side in contact with said liquid to be degassed;
   (c) said deflection cap having a second side closing a sealed chamber;
   (d) a source of high pressure fluid coupled to a volume inside said sealed chamber through an inlet valve;
   (e) an exhaust valve in fluid communication with said volume inside said sealed chamber; and
   (f) control means for repeatedly opening said inlet valve, retaining said inlet valve open until said deflection cap is deformed by pressure of said high pressure fluid in said volume, closing said inlet valve and suddenly opening said exhaust valve to allow said deflection cap to suddenly snap back toward an equilibrium position.

17. A method of creating a series of rarefaction pulses in a liquid, said method comprising the steps of:
   a) providing a chamber having one side closed by a stiff, elastically deformable deflection cap, said deflection cap having an outer side in contact with a liquid;
   b) deforming said deflection cap by introducing a fluid into said chamber under high pressure and allowing said high pressure fluid to deform said deflection cap;
   c) allowing said deflection cap to snap back to an equilibrium position to transmit a rarefaction pressure pulse into said liquid; and
   d) repeating said steps (b) and (c).

18. The method of claim 17 wherein said step (c) further comprises allowing said deflection cap to vibrate for an interval after allowing said deflection cap to snap back to an equilibrium position.

19. The method of claim 17 wherein said step of introducing a fluid into said chamber under high pressure is accomplished by providing a liquid-filled conduit in fluid communication with said chamber; causing a liquid to flow through said conduit; suddenly blocking said conduit downstream from said chamber to cause a high pressure water hammer pulse in said liquid within said conduit; and allowing said water hammer pulse to propagate into said chamber.

20. The method of claim 17 wherein said fluid is a gas.

* * * * *